(12) United States Patent
Amherd

(10) Patent No.: US 7,634,859 B2
(45) Date of Patent: Dec. 22, 2009

(54) PRESS DEVICE

(75) Inventor: René Amherd, Wollerau (CH)

(73) Assignee: Von Arx AG, Sissach (CH)

( * ) Notice: Subject to any disclaimer, the term of this patent is extended or adjusted under 35 U.S.C. 154(b) by 46 days.

(21) Appl. No.: 10/548,158

(22) PCT Filed: Nov. 24, 2003

(86) PCT No.: PCT/CH03/00774

§ 371 (c)(1),
(2), (4) Date: Sep. 18, 2006

(87) PCT Pub. No.: WO2004/078398

PCT Pub. Date: Sep. 16, 2004

(65) Prior Publication Data

US 2007/0033813 A1  Feb. 15, 2007

(30) Foreign Application Priority Data

Mar. 6, 2003 (CH) .................................... 0344/03

(51) Int. Cl.
*B26B 15/00* (2006.01)
*B26D 1/04* (2006.01)

(52) U.S. Cl. .............................. 30/233; 30/92; 30/228; 30/349; 83/196; 83/198

(58) Field of Classification Search ................ 30/228, 30/241, 182, 184, 180, 186–187, 224–225, 30/349, 244, 254, 92, 428, 29, 43, 120, 131, 30/233, 341, 258, 242, 245, 252, 191–193, 30/204, 208; 83/196–200; 72/456; 7/107, 7/131, 134

See application file for complete search history.

(56) References Cited

U.S. PATENT DOCUMENTS

| 2,421,414 | A | * | 6/1947 | Ernst | 83/197 |
| 3,143,025 | A | * | 8/1964 | Koester et al. | 83/641 |
| 4,475,423 | A | * | 10/1984 | Fuchs et al. | 83/199 |
| 6,230,542 | B1 | | 5/2001 | Frenken | |
| 6,434,998 | B2 | | 8/2002 | Amherd | |
| 7,216,573 | B2 | * | 5/2007 | Friend | 83/198 |
| 7,284,330 | B2 | * | 10/2007 | Wagner | 30/228 |

FOREIGN PATENT DOCUMENTS

| DE | 1 812 109 | | 6/1970 |
| DE | 297 03 053 | U1 | 4/1997 |
| EP | 0 712 696 | A1 | 5/1996 |
| EP | 0 941 813 | A1 | 9/1999 |
| EP | 1 114 698 | A2 | 7/2001 |

* cited by examiner

*Primary Examiner*—Boyer D. Ashley
*Assistant Examiner*—Laura M. Lee
(74) *Attorney, Agent, or Firm*—Pauley Petersen & Erickson

(57) ABSTRACT

A press device to be modified such that profile rods can also be removed by a shearing movement. The tool is configured so that a cutting plate can be fixed to each pivoting arm and is displaceably mounted in the opposite pivoting arm. The clamping arms of the pivoting arms have a fork-shaped slit and the cutting plates are maintained in the clamping arms with fixing bolts.

12 Claims, 4 Drawing Sheets

FIG. 17    FIG. 16    FIG. 18    FIG. 19
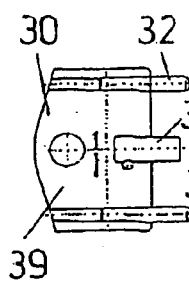
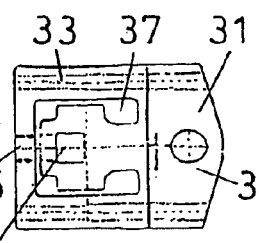
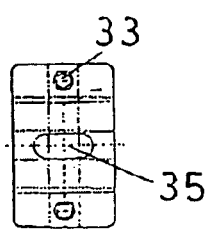
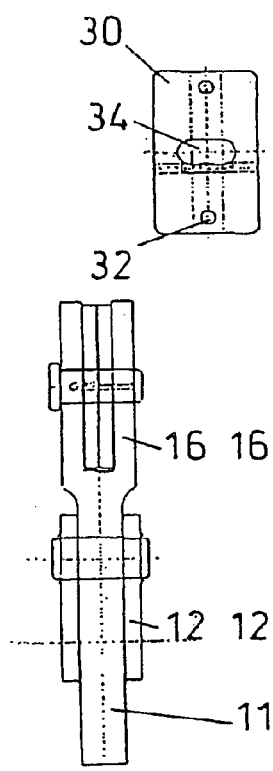
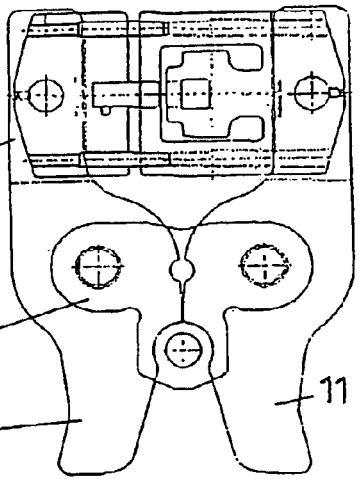
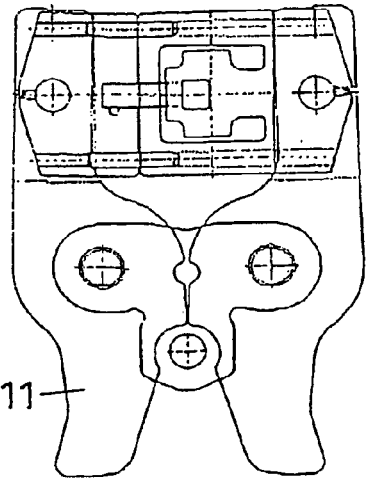
FIG. 15    FIG. 13    FIG. 14

PRESS DEVICE

BACKGROUND OF THE INVENTION

1. Field of the Invention

This invention relates to a pressing apparatus which is suitable for pressing coupling elements, and having a fork-like receiver.

2. Description of Prior Art

A known pressing apparatus has a fork-like receiver in which an exchangeably held tool is held by a connection bolt. A tool may be inserted into the fork-like receiver, and the tool has two pivot arms which may be moved towards one another and which between two carrier plates may be individually pivoted towards one another about a bearing bolt. The bearing plates which mostly have a roughly T-shaped design, apart from the bores in which the bearing bolts engage, each have a third bore through which the connection bolt engages when the tool is inserted into the fork-like receiver. The pressing apparatus has electromotorically or hydraulically actuated pressing rollers which bear on the two flanks of the two pivot arms, the flanks being directed towards one another, and thus in this region press the two pivot arms apart, wherein the regions in front of the two bearing bolts move towards one another.

The known pressing apparatus has been brought onto the market with much success. They are preferably for pressing the coupling elements together and thus for connecting two parts to one another. Known, mostly cylindrical coupling elements, for example press sleeves, press fittings or tube muffs are also tube sections which are inserted directly into one another. Accordingly, these pressing apparatuses are quite widespread in housing installations. Such apparatuses are particularly applied when installing heating installations, plumbing (sanitary) installations and gas conduit installations. The fitters who operate with these apparatus in each case exchange the tool held, depending on the nature of the connections to be created and the dimensions of the connections to be created.

The two European Patent References EP-A-0 712 696 and EP-A-0 941 813 are referred to for the design of the apparatus being considered. Tools which may be actuated with such pressing apparatus are described by German Patent Reference DE-U-29703053 and by European Patent Reference EP-A-1 114 698. The corresponding patent literature for the pressing apparatus as well as the tools is thorough.

The fitters who work with these apparatus not only need to create connections but must also assemble the corresponding conduits to the walls or in installations, to suitable frameworks of the installation. For this purpose widespread materials are used which remain the same in the individual fields. Thus the fitters for plumbing installations use a U-shaped profile on which the conduits may be attached and positioned differently in a horizontal or vertical manner. Furthermore, for assembly, another rod-like material is used, for example metal rods or threaded rods. Finally, smaller auxiliary materials often need to be used which need suitable elongated holes. Thus it becomes quite awkward if one requires additional machines for all these auxiliary tasks, which need to be supplied via conduits and leads and which despite this often accomplish the desired activities with little precision or with considerably much more effort.

SUMMARY OF THE INVENTION

It is one object of this invention to provide fitters and mechanics active at different locations with an apparatus which may be equipped with suitable tools with which one may carry out the most varied of tasks.

A pressing apparatus with the features set forth in this specification and in the claims achieves the above object. The shear plates may either have a design with the shape of guides of a profile to be cut off, as in one embodiment, or the two shear plates may also have several traversing round holes in order to be cut to length rod material with various diameters. It is also possible to design the two shear plates as a female and male die, so that the same press apparatus may be used for punch work as, for example, is suitable for forming elongated holes.

Other embodiments can be deduced from the claims and the specification and their significance and functioning are explained in the subsequent description with reference to the drawings.

BRIEF DESCRIPTION OF THE DRAWINGS

The drawings show different embodiments, wherein:

FIG. 13 shows a front view of an open tool with an inserted punch unit, having a female die and a male die;

FIG. 14 shows a front view of the tool as shown FIG. 13, but in a closed condition;

FIG. 15 shows a side view of the tool shown in FIG. 13;

FIG. 16 shows the male die in a plan view;

FIG. 17 shows a side view with a view of the punch;

FIG. 18 shows a plan view of the female die fitting with the male die, according to FIG. 16; and FIG. 19 shows a side view of the female die in a lateral view, with a view of the punch receiver.

DESCRIPTION OF PREFERRED EMBODIMENTS

Figure 1:
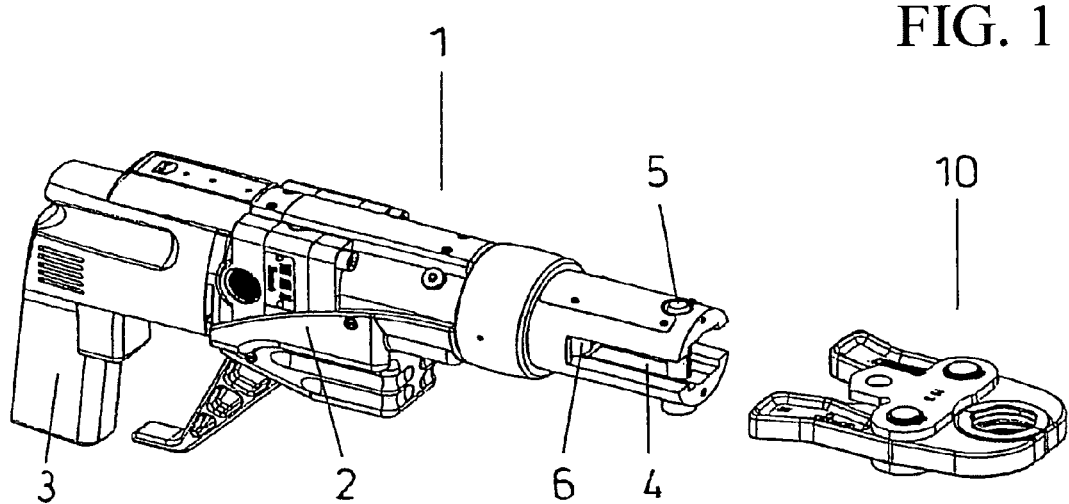
FIG. 1 shows a perspective view of a known pressing tool and a pressing clamping pincer capable of being applied therein.

The pressing apparatus indicated at 1 is shown in a perspective representation in FIG. 1. Such pressing apparatuses are most operated electrically either from a main voltage or by a battery. For this, a suitable electric motor is present in the drive housing 2, which either mechanically by way of a spindle or hydraulically by way of a pump and a piston-cylinder unit may push forwards or pull back suitable pressing rollers. With a suitable battery-operated apparatus the battery is often accommodated in the handle 3. A receiver 4 is connected to the drive housing 2. A connection bolt 5 passes through the fork-like receiver 4. The fitter or assembler working with the pressing tool selectively applies a tool 10 into the receiver, for which the fitter or assembler removes the secured connection bolt, inserts the tool 10 and subsequently again inserts and secures the connection bolt 5.

Figure 2:
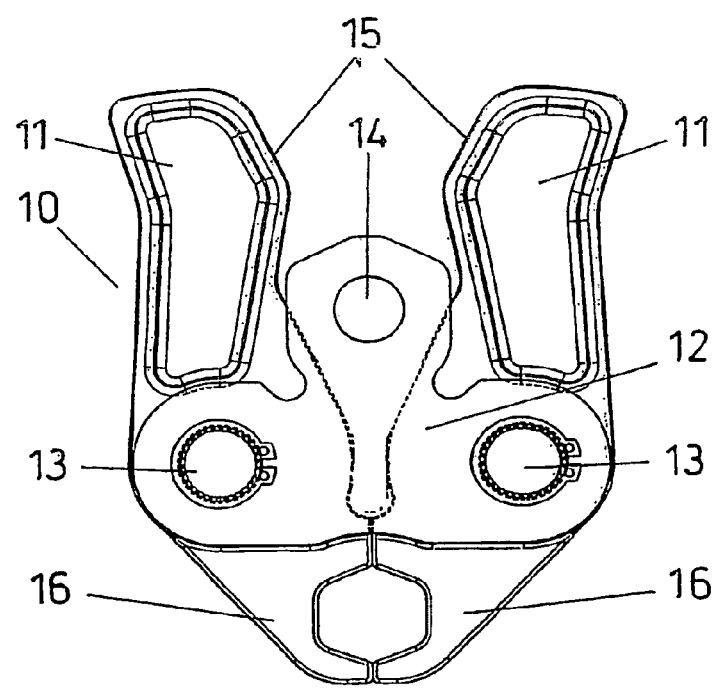
FIG. 2 shows a front view of the known press clamping pincer.
Figure 7:
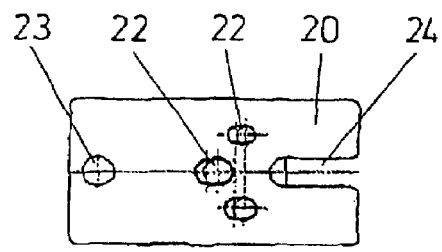
FIGS. 6 and 7 show front views of the two shear plates on their own.
Figure 6:
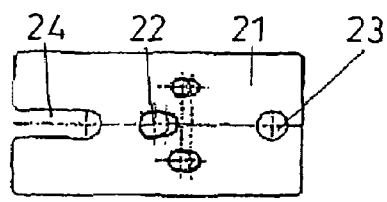

The tool 10 shown alone in FIG. 2 comprises two pivot arms 11 which are mounted in a pivotally moveable manner between two mostly T-shaped designed carrier plates 12 in each case by way of a bearing bolt 13. Accordingly, the two carrier plates 12 which are positioned exactly over one another each comprise a connection bolt hole 14 through which the connection bolt 5 of the receiver 4 is pushed. In the inserted position the pressing rollers 6 of the pressing apparatus 1 come to bear on the running surfaces 15 of the two pivot arms 11 and at the same time drive these outwards in a pivoted manner about the two bearing bolts 13, wherein simultaneously the front ends of the pivot arms 11 which are shown as clamping arms 16 are moved towards one another. Consequently, the position represented in FIG. 2 corresponds to the closed position. Usually the fittings to be pressed are larger than the receiver of the clamping pincer arms 16 so that at the beginning of the clamping activity the two pivot arms 11 near which the pressing rollers 6 become active, lie closer to one another than shown in FIG. 2 and thus need to be pressed apart.

Proceeding from these known premises, it is one object of this invention to make available additional tools which may be actuated with the known pressing apparatus and which correspond to these tools with regard to their basic conception.

Figures 3, 5:
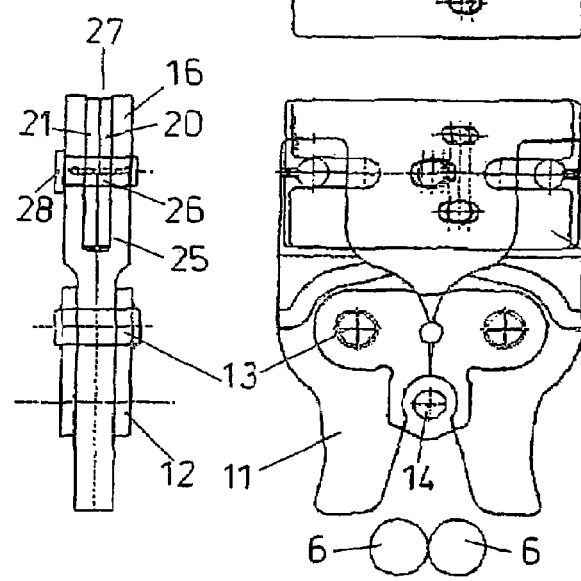
FIG. 3 shows a front view of a tool according to this invention which can be applied into the known apparatus, in an opened condition with applied shear plates.
FIG. 5 shows a side view of the tool according to FIGS. 3 and 4.
Figure 4:
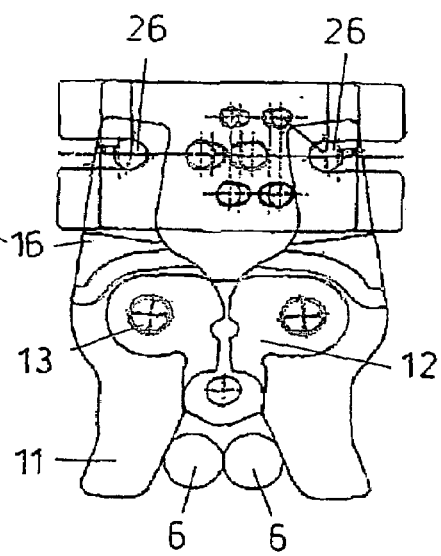
FIG. 4 shows a front view of the same tool, but in the actuated condition, as in FIG. 3.
Figure 12:
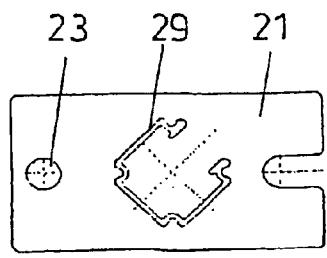
FIGS. 11 and 12 show front views of the two shear plates running towards one another.
Figure 11:
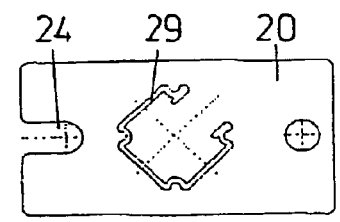
Figure 10:
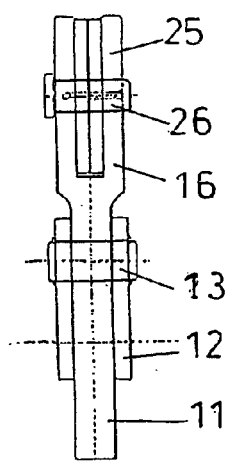
FIG. 10 shows a side view of the tool shown in FIG. 8.
Figure 8:
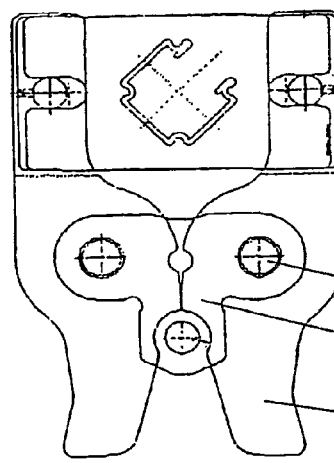
FIG. 8 shows a front view of a tool with applied shear plates, in an open position.
Figure 9:
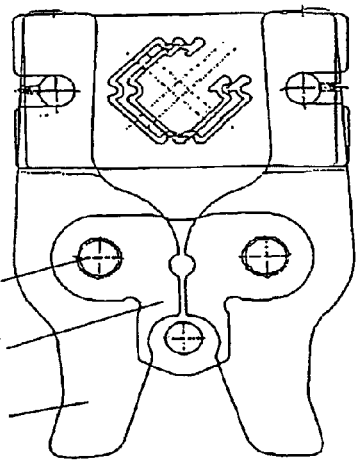
FIG. 9 shows a front view of the tool shown in FIG. 8, but in an actuated condition.

A first embodiment of a tool is shown in the FIGS. 3-7 which is suitable for cutting to length rod material with an essentially round cross section. The tool which is indicated in its entirety at 10 comprises pivot arms 11 which are pivotally mounted between two T-shaped carrier plates 12 about bearing bolts 13. Here via the connection bolt hole 14, the tool 10 may be connected to the receiver 4 by way of the connection bolt 5. The schematically represented pressing rollers 6 in FIG. 3 are shown in the initial position, and in FIG. 4 in the actuated end position. Here two cutting plates 20 and 21 are held between the two front ends of the pivot arms 11, the so-called clamp arms 16. Six traversing round holes 22 are formed in each cutting plate 20 or 21. With this, in each case two similarly large round holes are formed in an overlapping manner. The two diametrically opposed cutting plates 20 and 21 in each case on the one side comprise a carrier hole 23 corresponding to a fastening bolt and on the other side an elongated hole 24 corresponding to the same diameter.

The two pivot arms 11 which in the front region are indicated as clamp arms 16 in the preferred embodiment shown here have a fork-like receiver which is formed by a suitable centric milled recess 27. The width of the milled recess 27 corresponds at least to the thickness of the two shear plates 20 and 21. A fastening bolt 26 with a suitable head 28 passes through the fork 25 and the two shear plates 20 and 21. The fastening bolt 26 may be designed as a resilient expansion bolt and thus may be held in the prong of the fork with a positive fit and in the other with a non-positive fit. The fastening bolt 26 in the one plate in each case engages through the carrier hole 23 and in the opposite shear plate through the guiding elongate hole 24. On actuation of the pressing apparatus 1, the pressing rollers 6 are pushed forwards, the pivot arms 11 are driven apart and accordingly the clamping arms 16 are moved towards one another, wherein the shear plates 20 and 21 are moved oppositely relative to one another towards one another, wherein the traversing round holes 22 are displaced from their flush position into a position in which the traversing round holes are completely displaced to one another. Accordingly, the rods passing through the traversing round holes which are initially flush are severed in a clean manner. In the embodiment represented here the two shear plates 20 and 21 are simple flat plates. A minimal pivot movement with respect to the fastening bolts 26 at the same time is thus possible. It is however also possible to design the two shear plates 20 and 21 considerably thicker and instead fastening them in a fork-like receiver to fasten them at one side on two pivot arms. With this however for guiding the two cutting plates these have a tongue and groove so that a secure parallel guiding of the two shear plates is achieved. With the preferred embodiment shown here, the two shear plates may be designed thinner and significantly more economically without additional guiding measures being required.

The two guiding elongate holes, as shown here, do not need to be open towards the side but may also be holes which are closed per se. Open elongated holes help make the assembly of the exchangeable shear plates 20 and 21 quicker and simpler.

In a completely analogous manner, the FIGS. 8-12 show an embodiment by way of which a particularly common profile may be cut to length. For explaining the manner of acting only the pressing rollers 6 shown previously are omitted. The further elements of the tool, with the exception of the actual shear plates 20 and 21 are identical. Again the tool has suitable pivot arms 11 which are held between two T-shaped carrier plates 12 and are pivotable about bearing bolts 13. The clamping arms 16 are designed as a fork 25 and the shear plates 20 and 21 in the milled recess 27 are held or guided by fastening bolts 26. In contrast to the embodiment according to the FIGS. 3-7 however, the two shear plates 20 and 21 shown in the FIGS. 11 and 12 have guide-like openings 29 which are suitably formed in the shape of a profile cross section extremely commonplace with plumbing installations. The guide-like openings 29 should at the same time be arranged in the two shear plates so that no wall region of the cross section runs parallel to the actuation direction of the two shear plates. In the example shown here this is also not the case. Accordingly, the travel path with the corresponding shear movement only needs to be relatively small. The two shear plates 20 and 21 have suitable carrier holes 23 and guiding elongated holes 24. The guiding elongated holes 24 are designed shorter than in the previously shown example, corresponding to the smaller required travel. As one may easily recognize from the examples described here, there is no requirement for different tools 10 for the applications shown here, but only different shear plates.

That which has been cited previously in a practically analogous manner also applies to the last embodiment form according to the FIGS. 13-19. The basic construction of the tools 10 is identical. These again comprise the pivot arms 11 which in the front region are designed as clamping arms 16 and which again are arranged between two T-shaped carrier plates 12. The pivot arms 11 are mounted in the two mentioned carrier plates 12 by way of bearing bolts 13. The shear plates here are designed as a male die 30 and a female die 31. For guiding the male die 30 and the female die 31, one would provide suitable guide bolts 32 in one part and in the other part suitable guide bores 33. As is known from die technology, the male die 30 comprises a punch 34 and the female die 31 a punch receiver 35. An ejection opening 36 is in the female die 31 behind the punch receiver or punch guide 35, through which the punched out material may be laterally remove. In the example shown, the female die 31 and the male die 30 are designed so that elongated holes may be punched out. At the same time the female die is designed with a receiver opening 37 so that a profile may be inserted therein which corresponds to that profile which may be introduced by way of the tool, as is shown in FIGS. 8-12.

The male die and the female die may be designed of one or two parts. Here, shown symbolically is the possibility of a two-part male and female die, wherein basically a female die holder 28 and a male die holder 39 are present which are designed in the two clamping arms in a manner corresponding to the receiver, and wherein the actual female die and male die parts may be fastened in these holder parts 38 and 39. The described and shown embodiments are not conclusive but only indicate the enormous array of possibilities of differently designed shear plates. With regard to the concept however, the tools 10 would always be standardized so that these always fit the corresponding pressing apparatus 1 and on the other hand one would preferably also design the shear plates 20 and 21 with respect to their receivers in the pivot arms 11 of the tool 10. Only in this manner may the supplier offer a multitude of application possibilities with relatively little expense.

The invention claimed is:

1. A tool for a pressing apparatus having a receiver (4) and a connection bolt (5) for securing within the receiver, the tool comprising:

two carrier plates (12), each of the two carrier plates (12) including a bolt hole (14), wherein through the bolt hole (14) of each of the two carrier plates the connection bolt (5) extends to secure the tool to the receiver (4);

two pivot arms (11) pivotably mounted between the two carrier plates (12), each of the two pivot arms (11) having an end that is movable toward an other of the two pivot arms (11); and two shear plates (20, 21) extending between the two pivot arms and including aligned cutting elements for cutting an object, each of the two shear plates is pivotably held at a first end on one of the two pivot arms by a first bolt and guided at a second end on the other of the two pivot arms by a second bolt to allow straight linear movement of the two shear plates in directly opposing directions, wherein each of the two shear plates (20, 21) has a carrier hole (23) corresponding to a bolt cross section at the first end, and at the second end has a guiding elongated hole (24) corresponding to the bolt cross section, and each of the first and second bolts in the two clamping arms (16) traverses a carrier hole (23) of one of the shear plates and a guiding elongated hole (24) of an other of the shear plates, and respective ones of said guiding elongated holes (24) are open towards a side edge.

2. A tool according to claim 1, wherein the pivot arms (11) are designed as clamping arms (16) in a region distanced further from the pressing apparatus and accommodate the shear plates (20, 21).

3. A tool according to claim 2, wherein each of the clamping arms (16) comprises a fork (25) having a centric recess (27), and an end of each of the two shear plates (20, 21) is disposed within the centric recess (27) of each of the clamping arms (16), and the end of each of the two shear plates (20, 21) is passed through by one of the first and second bolts which passes through the fork (25) of a respective one of the clamping arms (16).

4. A tool according to claim 1, wherein the shear plates (20, 21) each has an identical guide opening (29) corresponding to a shape of a profile to be cut and forming the aligned cutting elements.

5. A tool according to claim 1, wherein the aligned cutting elements comprise traversing round holes (22) for cutting to length rod material of varying diameter.

6. A tool according to claim 1, wherein one of the shear plates (20, 21) is designed as a female die (31) and the other of the shear plates (20, 21) is designed as a male die (30).

7. A tool according to claim 6, wherein the female die (31) and the male die (30) are two parts, wherein one of the parts is a female die holder or a male die holder for fastening to the pivot arms (11) and each has a guide (32, 33) directed to one another, and the other parts are the actual female or male die corresponding to a punching to be carried out.

8. A tool according to claim 1, wherein the first bolt (26) extends through the carrier hole (23) of a first of the two shear plates (20, 21) and the elongated hole (24) of a second of the two shearplates (20, 21) to secure the two shear plates (20, 21) to a first of the two pivot arms, and the second bolt (26) extends through the carrier hole (23) of the second of the two shear plates (20, 21) and the elongated hole (24) of the first of the two shearplates (20, 21) to secure the two shear plates (20, 21) to a second of the two pivot arms.

9. A tool according to claim 8, wherein each of the elongated holes (24) is open at a side edge of the shear plate (20, 21).

10. A tool according to claim 1, wherein the shear plates are held aligned with each other by only the first and second bolts.

11. A tool for a pressing apparatus having a receiver (4) and a connection bolt (5) for securing within the receiver, the tool comprising:

two carrier plates (12), each of the two carrier plates (12) including a bolt hole (14), wherein through the bolt hole (14) of each of the two carrier plates the connection bolt (5) extends to secure the tool to the receiver (4);

two pivot arms (11) pivotably mounted between the two carrier plates (12), each of the two pivot arms (11) having an end that is movable toward an other of the two pivot arms (11); and two shear plates (20, 21) extending between the two pivot arms and including aligned cutting elements for cutting an object, each of the two shear plates having a carrier hole (23) at a first end and a guiding elongated hole (24) at a second end;

a first bolt extending through the carrier hole of a first of the two shear plates (20, 21) and the guiding hole (24) of a second of the two shear plates (20, 21); and a second bolt extending through the carrier hole of the second of the two shear plates (20, 21) and the guiding hole (24) of the first of the two shear plates (20, 21);

wherein the first of the two shear plates pivots about the first bolt and the second of the two shear plates pivots about the second bolt to allow a linear movement of the two shear plates each in a straight line and in a direction parallel to and opposite of an other of the two shear plates.

12. A tool according to claim 11, wherein each of the two shear plates (20, 21) has one of identical guide openings (29) corresponding to a shape of a profile to be cut and forming the aligned cutting elements.

* * * * *